United States Patent [19]
Derman et al.

[11] 3,713,659
[45] Jan. 30, 1973

[54] SEAL FOR RELATIVELY ROTATABLE PARTS

[75] Inventors: Karl Gustav Einar Derman, Savedalen; Sven-Erik Malmstrom, Reftele, both of Sweden

[73] Assignee: Forsheda Gummifabrik Aktiebolas, Forsheda, Sweden

[22] Filed: Aug. 21, 1970

[21] Appl. No.: 66,028

Related U.S. Application Data

[63] Continuation of Ser. No. 1,954, Jan. 12, 1970, abandoned, which is a continuation of Ser. No. 703,334, Feb. 6, 1968, abandoned, which is a continuation of Ser. No. 543,155, April 18, 1966, abandoned, which is a continuation-in-part of Ser. No. 72,741, Nov. 30, 1960, abandoned.

[30] Foreign Application Priority Data

Dec. 7, 1959    Sweden ........................ 11482/59

[52] U.S. Cl. ................................ 277/95, 277/134
[51] Int. Cl. ............................................ F16j 15/32
[58] Field of Search ............... 277/95, 134, 81–95

[56] References Cited

UNITED STATES PATENTS

| | | | |
|---|---|---|---|
| 2,167,669 | 8/1939 | Molyneux | 277/81 |
| 2,210,723 | 8/1940 | Kosatka | 277/81 |
| 2,243,227 | 5/1941 | Stratton | 277/81 |
| 3,504,918 | 4/1970 | Halliday | 277/134 |

FOREIGN PATENTS OR APPLICATIONS 691,504    7/1964    Canada ........................ 277/95

*Primary Examiner*—Robert I. Smith
*Attorney*—Howson and Howson

[57] ABSTRACT

A seal for two relatively rotatable parts of the type wherein a rotary shaft projects through a bearing housing wall that is disposed transversely to the shaft comprising an annular sealing member consisting of a resilient ring having a tubular body portion and an integral annular thin flexible lip projecting from one end thereof. The annular lip is defined at its inner end adjacent the body portion by an annular separation and has an outer wall constituted by an inwardly directed surface of revolution having a base angle of between 30° and 60° facing and normally bearing against the housing wall around the opening to seal the same. The ring body when unstretched has a smaller inner diameter than the outer diameter of the shaft and the body portion has a mass at least twice the mass of the lip to provide in combination with the smaller inner diameter the sole means for fixedly securing the ring against axial and rotational displacement on the shaft in position to cause the flexible lip to bear against the housing wall and seal the opening. The outer axial end face of the lip is provided with a spiral groove which produces a pumping effect upon rotation urging the lubricant radially outwardly toward the area of engagement of the lip and the wall of the bearing housing.

7 Claims, 8 Drawing Figures

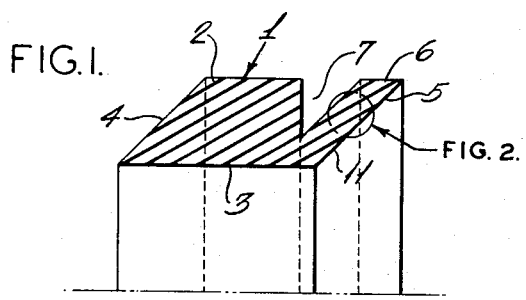
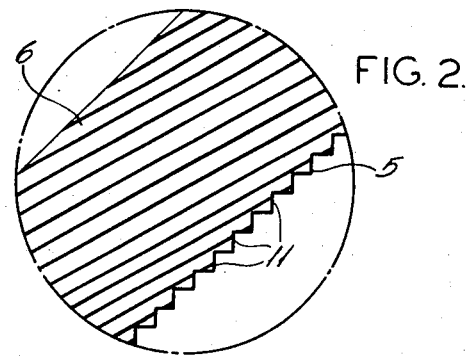
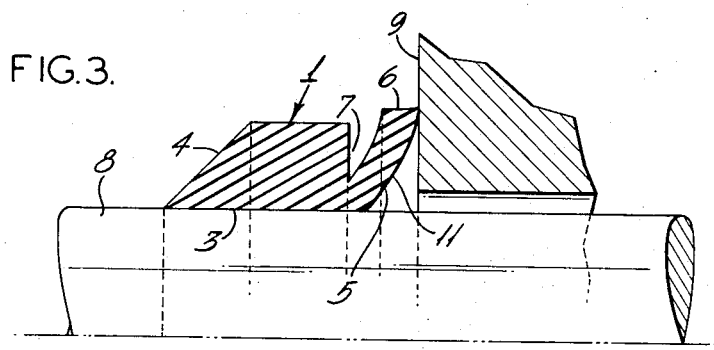
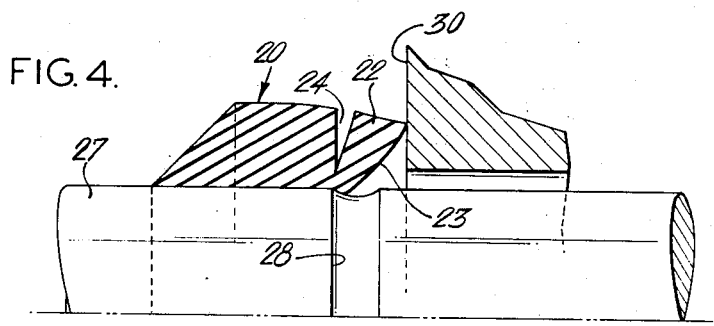
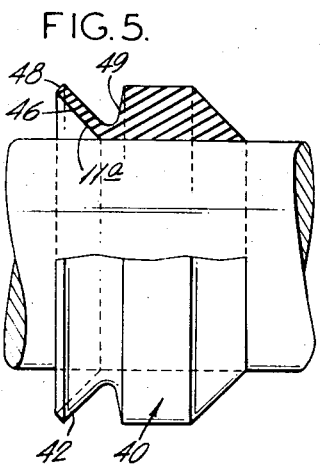
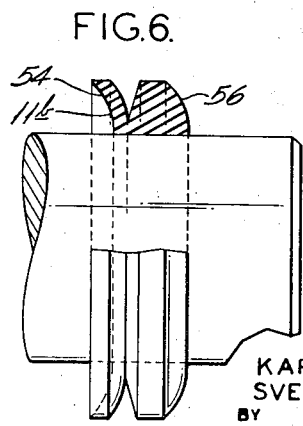
INVENTORS:
KARL GUSTAV EINAR DERMAN
SVEN ERIK MALMSTROM
BY Howson & Howson
ATTYS.

INVENTORS:
KARL GUSTAV EINAR DERMAN
SVEN ERIK MALMSTROM
BY Howson & Howson
ATTYS.

SEAL FOR RELATIVELY ROTATABLE PARTS

This is a continuation of our co-pending application Ser. No. 1,954 filed Jan. 12, 1970, and now abandoned which in turn is a continuation of our application Ser. No. 703,334 filed Feb. 6, 1968, now abandoned, which in turn is a continuation of our co-pending application Ser. No. 543,155 filed Apr. 18, 1966, now abandoned, which was a continuation-in-part of our application entitled "Seals Between Two Relatively Rotatable Parts" filed on Nov. 30, 1960, bearing Ser. No. 72,741, and now abandoned (earliest).

The present invention relates to an all-around seal for mounting on a shaft and adapted to provide a seal between the shaft and a member such as a bearing housing having a surface extending transversely to the axis of rotation of the shaft and to a method of making such a seal. Several characteristic properties are required for such an all-around seal for general machine structures. Primarily, it should be able to be used in connection with dust, oil and liquids, such as water. Its sealing ability both at high and low speeds must be perfectly satisfactory. A labyrinth seal does not meet this requirement because its sealing ability at low speeds is rather limited. Rubbing lip seals, on the other hand, do not withstand high peripheral speeds.

The ideal seal would thus be one that has a rubbing action at low speeds and functions with a decreasing lip pressure or as a labyrinth seal at high speeds. Other characteristics required of a seal are that it should be economical and easy to mount. Moreover, it should be readjustable in case of wear. For a satisfactory function of an oil seal, which operates under friction, a great many requirements have to be satisfied. The lip and the sealing surface which the lip engages must have extraordinarily fine surfaces. The specific pressure of the lip against the sealing surface must be kept within relatively narrow limits. Too high a pressure occasions a high frictional resistance and the risk that the oil film between the lip and the sealing surface will be broken which results in dry running and abnormal heat development. At temperatures over a certain level the rubber will become hard and the decrease in elasticity which unavoidably occurs in a firmly engaged rubber lip is usually compensated for by a temperature-resistant spring element. The specific surface pressure of the sealing lip against the sealing surface must not be too small since leakage may readily result therefrom. Attention has been paid to a possibility of reducing the surface pressure by exploiting some sort of pumping effect for instance by giving the relatively sliding surfaces a suitable surface structure.

The present invention provides a seal having all of the above described properties which will be apparent from the following detailed description and a method for making such a seal. A seal made in accordance with the present invention consists of a resilient annular body portion which is adapted to be mounted on a shaft and at one end has an integral annular funnel-shaped flexible sealing lip projecting from the inner portion of the body, which lip is formed between an outwardly open annular groove and an inwardly directed surface of revolution. The lip of the seal is adapted to engage a surface extending substantially transversely to the axis of rotation of the shaft on which it is mounted with the lip side wall facing the transverse surface.

In order to eliminate the above-mentioned disadvantages connected with conventional oil seals of the type described, the contact face of the lip is provided with a spiral groove which produces a pumping effect on rotation thereby increasing the efficiency of the seal with regard to the sealing effect and also reducing contact pressure between the lip and the contact surface and also subsequently frictional heat. Since the contact pressure is low the risk of rupturing the film of oil existing between the two surfaces will be eliminated. In conventional seals sealing occurs between two neutral surfaces and the requirements regarding surface finish are stringent. According to the invention the necessity of extremely fine surface finish is not as critical due to the presence of a comparatively thick film of oil which is continuously pumped away from the gap between the lip and the sealing surface by the spiral groove configuration. Thus the purpose of the spiral groove is to overcome forces tending to suck in oil into the gap between the lip and the sealing surface. These forces are capillary forces, surface tension, visco-elastic forces and adhesion forces.

Other objects and features of the method of making a seal in accordance with the present invention and the various details of the seal are described in detail hereinafter with reference to the accompanying drawings in which:

FIG. 1 shows one embodiment of seal made in accordance with the present invention;

FIG. 2 is an enlarged fragmentary view of the portion of the lip circled in FIG. 1;

FIG. 3 shows the seal of FIG. 1 mounted on a shaft in sealing engagement with a surface of a bearing housing or the like;

FIG. 4 shows another embodiment of seal mounted on a shaft having an annular groove to deflect the lip into sealing engagement with the surface of a bearing housing or the like;

FIGS. 5 and 6 show still other forms of seals made in accordance with the present invention;

Figure 7:
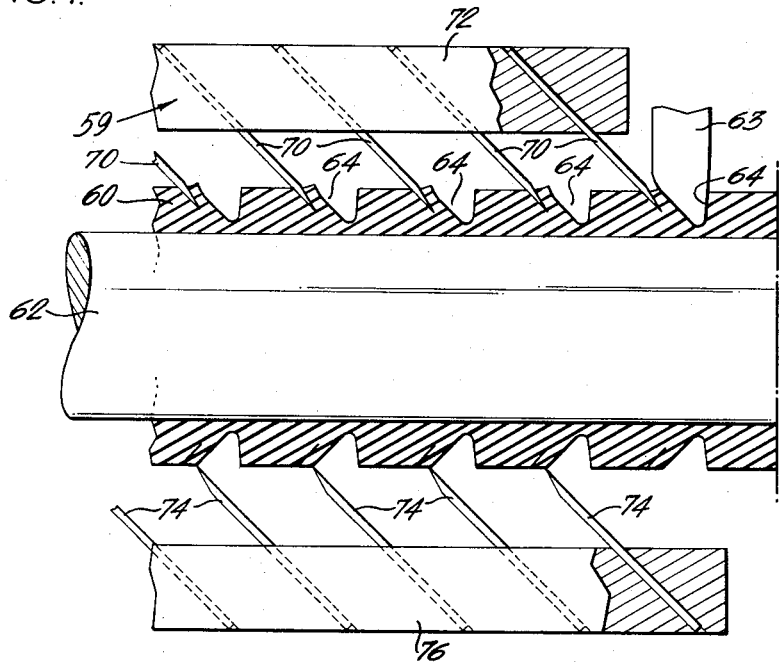
FIG. 7 shows a system for making seals in accordance with the present invention.

Referring now to the drawings, there is shown in FIGS. 1–3 inclusive an annular seal made in accordance with a first embodiment of the present invention. The seal comprises a generally cylindrical tubular member or ring 1, which is preferably made of an elastomeric material such as rubber and has an outer boundary surface 2 and an inner boundary surface 3 which are concentric with the central longitudinal axis of the ring 1. The axial ends of the ring 1 are defined by two separate surfaces of revolution, an outer surface 4 and an inner surface 5 which are preferably of the same configuration. A separation, in the present instance, an upwardly open annular groove 7 of V-shaped cross section is provided in the outer peripheral surface of the ring 1 adjacent one axial end thereof. The groove 7 cooperates with the inner surface 5 to define an annular sealing lip 6 whose inner surface 5 constitutes an inwardly directed surface of revolution which in the present instance is conical. The conical surface of revolution 5 is formed so that it is disposed at an angle of between 30° and 60° preferably about 45°, to the central axis of the ring 1. In the present instance the inwardly directed surface of revolution 5 is parallel to one wall of the groove 7 to provide a flexible lip of uniform thickness.

But it has been shown to be advantageous if the thickness of the lip decreases from the root to the periphery of the lip since this eliminates any tendency to collapsing when the ring is stretched round the shaft due to the fact that the root portion is extended axially thereby imparting a means of support to the lip which will always tend to flare toward the sealing surface as the center of area of the section of the lip is always situated slightly forward of the portion of the ring attaching the lip to the body.

The contact side of the conical surface of revolution 5 is provided with a spiral groove 11, the dimensions of the depth and width of which are comparatively fine such that a positive sealing action is obtained not only dynamically, but also when the shaft is stationary. The direction of the path of the of the spiral may be selected clockwise or anti-clockwise depending on the direction of rotation of the shaft. For example, where the shaft on which the seal is mounted rotates in a clockwise direction with respect to FIG. 8, the spiral groove 11 is arranged in a counter-clockwise direction to effect pumping action of the lubricant radially outwardly to the area of contact of the outer portion of the flexible lip with the stationary housing. In applications where the shaft rotates in the opposite direction, the groove is disposed in a clockwise manner.

As illustrated in FIG. 3, the ring 1 is adapted to be mounted on a shaft 8 adjacent a transverse surface 9 on a bearing housing or the like whereby the sealing lip engages the surface 9. The shaft 8 is preferably of a slightly larger diameter than the inner diameter of the ring in its non-expanded condition. In the mounted position, the resilient ring 1 is thus expanded around the shaft 8 whereby the sealing lip 6 may be located in a correct position relative to the transverse surface 9 to provide the sealing action. As illustrated in FIG. 2, when the sealing ring is disposed in a proper position relative to the transverse surface 9, the sealing lip 6 engages the surface 9 and is deflected slightly to provide a desired sealing pressure against the transverse surface 9. As illustrated in the drawings, the body portion is preferably of a mass at least twice the mass of the sealing lip 6 to provide in combination with the smaller inner diameter of the seal relative to the shaft the sole means for fixedly securing the sealing ring against axial and rotational displacement on the shaft in position to cause the flexible lip 6 to bear against the housing wall 9 and seal the opening.

A seal made in accordance with a second embodiment of the present invention is illustrated in FIG. 4. As illustrated, the seal comprises a generally cylindrical tubular member of ring 20 having a sealing lip 22 at one axial end thereof with an inwardly directed surface of revolution 23 which is conical. In the present instance, the sealing lip is formed by circumferential groove or slit which may extend radially of the ring as at 24 in FIG. 3 or at an angle to the central axis of the ring. In order that the sealing lip 22 of this embodiment function in the same manner as the sealing lip 6 described above, the shaft 27 on which it is mounted is provided with a circumferential groove 28. The shaft 27 is preferably of a slightly larger diameter than the inner diameter of the ring in its non-expanded condition. By this arrangement, when the seal is positioned on the shaft in the manner illustrated in FIG. 4, the sealing lip 22 is deflected toward the transverse surface 30 and engages the transverse surface with a slight pressure. In accordance with this embodiment of the invention, the body portion is preferably of a mass at least twice the mass of the sealing lip 22 to provide in combination with the smaller inner diameter of the seal relative to the shaft the sole means for fixedly securing the sealing ring against axial and rotational displacement on the shaft in position to cause the flexible lip 22 to bear against the housing wall 30 and seal the opening.

The seal illustrated in FIG. 4 is made in accordance with the second embodiment of the present invention by forming conical surfaces of revolution at axial ends of the ring 20 and thereafter forming a separation in the form of a slit extending from the outer peripheral surface of the ring adjacent to but short of the inner peripheral surface thereof to define the flexible lip 22. The slit may be formed by advancing a cutting tool in a radial direction to form the seal shown in FIG. 3 and in a direction parallel to the conical surface of revolution 23 to form the seal shown in FIG. 4.

The seal illustrated in FIG. 5 is substantially identical to that illustrated in FIGS. 1 and 2 comprising a generally cylindrical tubular member or ring 40 having a flexible sealing lip 42 at one axial end thereof defined by an upwardly open annular groove 49 of V-shaped cross section and an inwardly directed conical surface of revolution 46. However, in accordance with this embodiment of the invention, the apex of the lip is defined by the inwardly directed surface of revolution 46 and a conical surface 48 having its apex confronting the transverse surface which it is adapted to engage. The conical surface 46 is provided with a shallow spiral groove 11a caused by the method of manufacturing, which will be described in connection with FIG. 7.

FIG. 6 illustrates a seal made in accordance with still another embodiment of the present invention wherein the surface of revolution at each axial end of the ring is curved as at 54 and 56 and preferably generated by an arc of a circle. It is noted that this construction is more compact than the seals discussed above.

The surface 54 is provided with a spiral groove 11b, the task of which has been described above.

As illustrated in the drawings, in the embodiments described, the body portion of the seal is preferably of a mass at least twice the mass of the sealing lip to provide in combination with the smaller inner diameter of the seal relative to the shaft the sole means for fixedly securing the sealing ring against axial and rotational displacement on the shaft in position to cause the flexible lip to bear against the housing wall and seal the opening.

There is shown in FIG. 7 an example of apparatus 59 for making seals in accordance with the present invention. In accordance with the present invention, an elongated tube 60 of elastomeric material is positioned on a mandrel 62 of relatively soft material such as wood, rubber or the like. The mandrel 62 is rotated by suitable means, for example a lathe. Thereafter, when forming a seal such as shown in FIGS. 1 and 2, V-shaped grooves 64 are formed in the tube 60 at axially spaced points therein by cutting or grinding. It is noted that these grooves 64 may be formed prior to mounting the tube 60 on the mandrel by cutting, grinding or by a molding process. Thereafter, the tube 60 is divided into the rings by means of a pointed cutting tools 70 which engage and cut the tube adjacent each of the annular grooves 64 along surfaces of revolution that constitute the rear end and the lip end of the adjacent ring at each cutting tool. When seals are produced in accordance with the above method, a spiral groove is obtained automatically on the sealing lip.

As illustrated in FIG. 7, the cutting tools 70 are mounted in a plate 72 which is adapted to be moved obliquely toward and away from the mandrel 62 for cutting the tube 60 in the manner described above to form the sealing rings. A guide member 63 is connected to the plate 72 through an adjustable coupling (not shown) and engages in one of the V-shaped grooves 64 as indicated to locate the plate 72 and its associated cutting tools in a desired position relative to the tube. The plate 72 is also movable axially of the mandrel 62 and is adjustable with respect to the guide members 63 whereby the thickness of the sealing lip can be controlled selectively and the seal are thereby adapted for use in a variety of applications.

With the employment of making a plurality of seals simultaneously, it is necessary that the tubular member is provided with equi-distant V-shaped recesses so that deformation of the elastomeric material due to the presence of the cutting tools may be accommodated as the cutting tools are fed toward the axis of rotation. If this process was attempted in a cylindrical tub without the presence of recesses, the compression of material due to the insertion of the cutting tools would be so great that this force overcome the friction between the tubular member and the mandrel and the cutting operation could not be executed.

In employing the apparatus to make a seal as shown in FIG. 5, a further set of cutting tools 74 is employed to provide the conical surface 48. The cutting tools 74 are fixed to a plate 76.

In order to demonstrate the operation of the cutting tools 70 and 74, they have been illustrated in cutting engagement with the tube in FIG. 5. However, during normal operation the tools 70 and 74 alternately engage the tube and in a preferred embodiment of the apparatus the plates 72 and 76 are therefore mounted in such a way that when one plate moves toward the mandrel 62, the other moves away from the mandrel. Additionally, the conical surfaces 48 preferably should be cut with the tools 74 before the tube 62 is operated upon the cutting tools 70 as described above for the purpose of dividing it into rings.

In connection with the seals shown in FIG. 6, the apparatus may be employed to form the curved axial end faces by moving them in an axial as well as radial direction during their movement towards the mandrel thereby to provide the rounded surfaces of revolution at the axial ends of the ring. In order to facilitate packeting of the seals, it is possible to adjust the cutting tool to leave a thin web which connects rings adjacent to each other.

Figure 8:
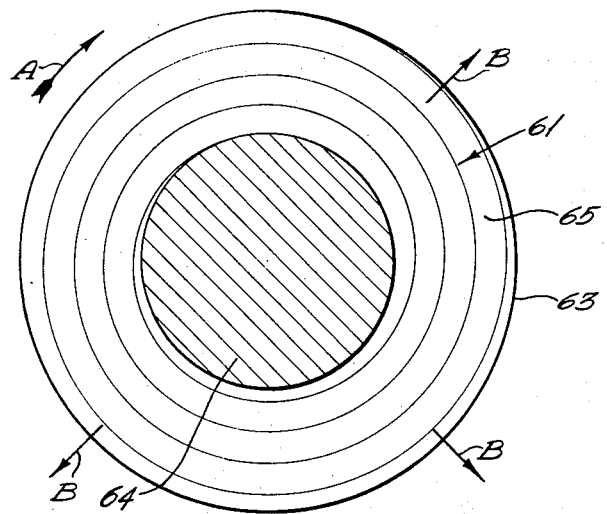
FIG. 8 has an enlarged view showing the outer axial end face of the flexible lip of a seal in accordance with the present invention.

FIG. 8 shows schematically a groove 61 on the contact surface 65 of the sealing lip 63. The sealing ring is expanded on a shaft 64. On FIG. 6 the lip is seen toward the contact surface. When rotating the shaft in the direction of the arrow A the spiral groove will transport oil or any other liquid outward in the direction of the arrows B. An opposite rotation of the shaft will cause leakage. According to the invention, providing of such a spiral on the contact face of the lip cannot be avoided. Thus it is of utmost importance that the direction of rotation of the mandrel 62 be correctly chosen (see FIG. 7).

We claim:

1. A seal consisting essentially of resilient flexible material for two relatively rotatable parts of the class wherein a rotary shaft projects through an opening in a housing wall that is disposed transversely of said shaft, consisting of a resilient ring having a generally cylindrical tubular body portion and an integral annular thin flexible lip connected by a hinge at one axial end face of said body portion adjacent its inner peripheral surface, said annular lip extending outwardly radially and axially away from said body portion, the axially outer face of said lip being conical and displsed at an angle between 30° and 60° to the axis of said ring for normally bearing against said housing wall around the opening therein to seal said opening, the other axial end face of said body portion remote from said sealing lip lying in a plane angularly disposed to a plane perpendicular to the central axis of the body portion, said sealing lip radial projecting to an extent at least equal to the maximum radial dimension of said body portion, said ring body when unstretched having a smaller inner diameter than the outer diameter of said shaft to cause the ring to tightly grip the shaft and said body having a mass at least about twice the mass of said lip to provide in combination with said smaller inner diameter the sole means for fixedly securing the ring against axial displacement on the shaft in position to cause the flexible lip to bear against the housing wall and seal said opening.

2. A seal as claimed in claim 1 wherein the end of said sealing lip is defined by a cylindrical surface concentric with the central axis of the resilient ring.

3. A seal as claimed in claim 1 wherein said annular separation between said lip and body portion comprises a radially extending slit disposed perpendicularly to the central axis of said resilient ring.

4. A seal as claimed in claim 1 wherein the annular separation between said lip and body portion comprises a circumferentially extending V-shaped groove.

5. In combination with a rotary shaft which projects through a bearing housing wall disposed transversely of the shaft, said shaft having a circumferentially extending groove therein, an annular sealing member consisting of a resilient ring having a generally cylindrical tubular body portion and an integral annular flexible lip projecting from one end thereof, said sealing member adapted to be mounted on said shaft with the juncture of said lip and body portion overlying said annular groove in said shaft to cause said lip to be deflected outwardly from said body portion to engage said bearing housing wall, said annular lip being defined at its inner end adjacent the body portion by an annular separation and having an outer wall constituted by an inwardly directed surface of revolution having a base angle between 30° and 60° facing and normally bearing against said housing wall around the opening therein to seal said opening, said ring body when unstretched having a smaller inner diameter than the outer diameter of said shaft to cause the ring to tightly grip the shaft and said body having a mass at least about twice the mass of said lip to provide in combination with said smaller inner diameter the sole means for fixedly securing the ring against axial displacement on the shaft in position to cause the flexible lip to bear against the housing wall and seal said opening.

6. The combination as claimed in claim 5 wherein said annular separation comprises a radially extending slit disposed perpendicular to the central axis of said resilient ring.

7. The combination as claimed in claim 5 wherein said annular separation consists of a circumferentially extending slit disposed parallel to said inwardly directed surface of revolution.

* * * * *

UNITED STATES PATENT AND TRADEMARK OFFICE
CERTIFICATE OF CORRECTION

PATENT NO. : 3,713,659
DATED : January 30, 1973
INVENTOR(S) : Karl Gustav Elmar Derman and Sven-Erik Malmstrom It is certified that error appears in the above—identified patent and that said Letters Patent is hereby corrected as shown below:

On the title page, under the heading "Assignee", —Aktiebolag— has been substituted for "Aktiebolas".

On the title page, under the heading "Related U.S. Application Data", —which is a continuation of Ser. No. 195,137, May 16, 1962, abandoned,— has been added before "which".

Column 1, line 8, —which is a continuation of our co-pending application Ser. No. 195,137, filed May 16, 1962, now abandoned,— has been added before "which".

Signed and Sealed this

Fifteenth Day of June 1982

[SEAL]

*Attest:*

*Attesting Officer*

GERALD J. MOSSINGHOFF
*Commissioner of Patents and Trademarks*